United States Patent
Oroskar et al.

(10) Patent No.: US 9,258,729 B1
(45) Date of Patent: Feb. 9, 2016

(54) ENHANCED FORCED DORMANCY BASED ON AIR INTERFACE CONDITIONS

(71) Applicant: Sprint Spectrum L.P., Overland Park, KS (US)

(72) Inventors: Siddharth S. Oroskar, Overland Park, KS (US); John W. Prock, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 368 days.

(21) Appl. No.: 13/666,126

(22) Filed: Nov. 1, 2012

(51) Int. Cl.
*H04W 28/02* (2009.01)

(52) U.S. Cl.
CPC .................................. *H04W 28/0205* (2013.01)

(58) Field of Classification Search
None
See application file for complete search history.

(56) References Cited

U.S. PATENT DOCUMENTS

| | | | |
|---|---|---|---|
| 7,058,031 B2 * | 6/2006 | Bender et al. | 370/329 |
| 2003/0179727 A1 * | 9/2003 | Soong et al. | 370/328 |
| 2006/0039323 A1 * | 2/2006 | Ji et al. | 370/328 |
| 2012/0282963 A1 * | 11/2012 | Xi | H04W 76/068 455/509 |
| 2013/0223273 A1 * | 8/2013 | Chang et al. | 370/252 |

* cited by examiner

*Primary Examiner* — Adnan Baig (57) ABSTRACT

A method, system, and apparatus for managing release of air interface traffic channels are described. When a radio access network (RAN) is deciding whether to release traffic channels assigned to one or more of a plurality of mobile stations, the RAN may prioritize the release of the assigned air interface traffic channels based on reported air interface conditions. For instance, when the RAN is deciding whether to release a traffic channel from a first mobile station or a second mobile station, the RAN may determine to release the assigned traffic channel from the first mobile station if the first mobile station is experiencing worse air interface conditions.

18 Claims, 3 Drawing Sheets

ENHANCED FORCED DORMANCY BASED ON AIR INTERFACE CONDITIONS

BACKGROUND

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. In a typical arrangement, a base station of a RAN may radiate to define a wireless coverage in which mobile stations (such as cell phones, tablet computers, tracking devices, embedded wireless modules, and other wirelessly equipped communication devices) can operate. In turn, each base station is typically coupled with one or more transport networks, such as the public switched telephone network (PSTN) and/or the Internet for instance. With this arrangement, a mobile station operating within a coverage area of a base station can engage in air interface communication with the base station and can thereby communicate via the base station with various remote network entities or with other mobile stations.

In practice, communications over the air interface between a base station and a mobile station are structured in accordance with a particular air interface protocol or "radio access technology," with communications from the base stations to mobile stations defining a "forward link" (or downlink) and communications from the mobile stations to the base station defining a "reverse link" (or uplink). Numerous such protocols are well known in the art, and others may be developed in the future. Examples of existing protocols include CDMA (e.g., 1×RTT, 1×EV-DO), LTE, WiMAX, iDEN, TDMA, AMPS, GSM, GPRS, UMTS, EDGE, microwave, satellite, MMDS, Wi-Fi (e.g., IEEE 802.11), and Bluetooth. Each protocol may define its own procedures for initiation of calls, handoff between coverage areas, and functions related to air interface communication.

Within the context of a RAN, the term "base station" is sometimes used to describe simply a device known as a base transceiver station (BTS), which contains the hardware, antennas, and so forth that actually conduct the over-the-air portion of the communication with the mobile station on behalf of the RAN. At times, however, the term "base station" is used to refer to a combination of (i) one or more BTSs and (ii) a device known as a base station controller (BSC) (or radio network controller (RNC)), which controls the BTS(s) and connects it (them) to the rest of the network. Further, a base station may encompass functions of one or more other RAN entities as well.

In a typical scenario, a mobile station registers with a RAN via a particular BTS, and then operates in what is known as "idle mode" on a carrier frequency in a coverage area provided by that BTS. If another telephone, computer, or other communication device attempts to contact the mobile station, the RAN will typically send the mobile station a page message via at least that particular BTS. The mobile station may respond by requesting and establishing communication on what is known as an air interface traffic channel (or simply a traffic channel), and proceed to conduct the relevant communication. In other instances, the mobile station may itself originate a communication, in which case the mobile station sends the RAN an access-request message in order to request and establish communication on a traffic channel to conduct the relevant communication. In either scenario, after the RAN has established a radio link and allocated a traffic channel for use by the mobile station, the mobile station is said to be operating in what is known as an "active mode" or "connected mode".

In some instances, once no substantive communication has taken place between the RAN and the mobile station for a certain amount of time, the RAN will typically reclaim the radio resources (including the traffic channel) that it had allocated to that mobile station, in order to make such resources available for other mobile stations in the coverage area. This transition of the mobile station from (i) having radio resources allocated to it to (ii) not having radio resources allocated to it is often referred to as the mobile station transitioning from active to "dormant". In some cases, a mobile station may be defined as being dormant if the radio link has been released but a data link layer connection still exists. In such cases, a dormant mobile station may transition back to an active mode by acquiring a radio link and beginning to use the existing data link layer connection. In one example, the amount of time allowed by the RAN to elapse between the last use of the traffic channel and the reclaiming of the traffic channel may be determined based on a value that is specified for a system parameter known as a dormancy timer (or active-to-dormant timer).

OVERVIEW

As the number of mobile stations within a coverage area of a particular RAN increases, the number of simultaneous active mobile stations communicating via the RAN may often reach its maximum value for the RAN. Unfortunately, this scenario may be problematic when attempting to establish new communications for other mobile stations in a coverage area of the RAN, due to a lack of available air interface traffic channels, for instance.

Disclosed herein is a mechanism (e.g., method, system, and/or apparatus) to manage air interface traffic channels, by intelligently releasing air interface traffic channels based on air interface conditions experienced by the mobile stations. In particular, the mechanism may allow the RAN to prioritize the release of air interface traffic channels based on determined air interface conditions for the mobile stations.

In one respect, disclosed is a method for managing air interface traffic channels in a coverage area of a RAN. Within the coverage area, each of a plurality of mobiles stations may currently have an assigned air interface traffic channel. The method may then involve the RAN determining, respectively for each mobile station of the plurality, an air interface condition associated with the mobile station. Further, the method may involve the RAN performing a comparison of the determined air interface condition associated with a first one of the mobile stations with the determined air interface condition associated with a second one of the mobile stations. The method may then involve the RAN determining, based at least in part on the comparison, that the RAN should release the air interface traffic channel assigned to the first mobile station rather than releasing the air interface traffic channel assigned to the second mobile station. And the method may also involve, responsive to the determining that the RAN should release the air interface traffic channel assigned to the first mobile station, the RAN releasing the air interface traffic channel assigned to the first mobile station.

In another respect, disclosed is a system for managing air interface traffic channels in a coverage area of a RAN. Such a system may take the form of a RAN having an antenna structure and a controller. The antenna structure may be arranged to radiate so as to define an air interface coverage area in which to serve a plurality of mobile stations. The controller may then be arranged to assign to each of the plurality of mobile stations a respective air interface traffic channel in the air interface coverage area and to determine that each air interface channel assigned to a mobile station of the plurality has been idle for at least a threshold duration. The controller may further be arranged to determine, respectively for each mobile station of the plurality, an air interface condition associated with the mobile station. Additionally, the controller may be arranged to respond to the determining that each air interface traffic channel assigned to a mobile station of the plurality has been idle for at least the threshold duration by comparing the determined air interface conditions of the plurality of mobile stations to identify a mobile station that has the poorest determined air interface condition. And the controller may then be arranged to respond to the identifying of the mobile station that has the poorest determined air interface condition by releasing the air interface traffic channel assigned to the identified mobile station.

Further, in still another respect, disclosed is an apparatus for managing air interface traffic channels in a coverage area of a RAN, such as air interface traffic channels that are currently assigned to each of a plurality of mobile stations. The apparatus may take the form of a non-transitory computer readable medium having encoded thereon instructions executable by a processing unit to carry out particular functions. The functions may include determining, respectively for each mobile station of the plurality of mobile stations, an air interface condition associated with the mobile station. Further, the functions may include performing a comparison of the determined air interface condition associated with a first one of the mobile stations with the determined air interface condition associated with a second one of the mobile stations. Yet further, the functions may include determining, based at least in part on the comparison, that the RAN should release the air interface traffic channel assigned to the first mobile station rather than releasing the air interface traffic channel assigned to the second mobile station. And the functions may include, responsive to the determining that the RAN should release the air interface traffic channel assigned to the first mobile station, releasing the air interface traffic channel assigned to the first mobile station. Thus, the apparatus may facilitate managing air These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

For illustration, the present method will be described with respect to communications of the CDMA2000 family (e.g., 1×RTT and EV-DO communications). It should be understood, however, that part or all of the method may apply equally to other air interface protocols in which traffic channels or the like are assigned to mobile stations.

a. Example Wireless Communication System

Referring to the drawings, as noted above, FIG. 1 is a simplified block diagram of an example communication system in which the present method can be implemented. It should be understood, however, that this and other arrangements described herein are provided as examples only, and other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and may be implemented at least in part by one or more computer processors executing program instructions stored in a non-transitory computer readable medium.

Figure 1:
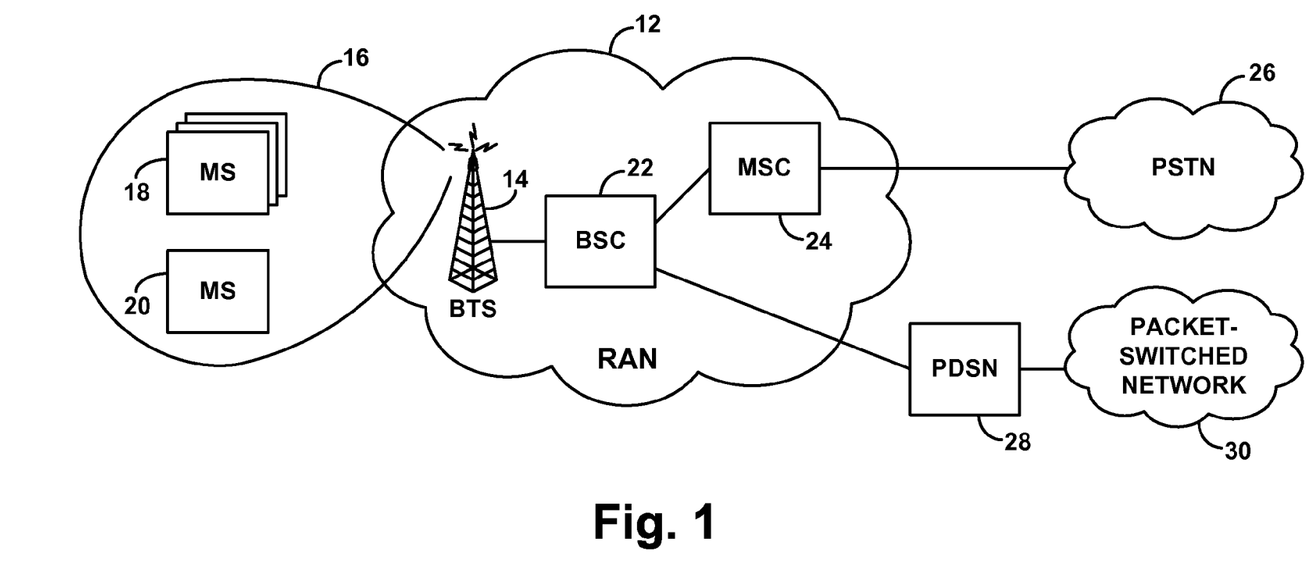
FIG. 1 is a simplified block diagram of a network in which the method can be implemented.

As shown in FIG. 1, the example system includes at its core a RAN 12 having a representative BTS 14 that radiates to define a representative air interface coverage area 16 (e.g., cell sector). Shown operating within the coverage area 16 are then several representative mobile stations 18 having assigned air interface traffic channels as well as another mobile station 20 that does not currently have an assigned air interface traffic channel.

BTS 14 is shown coupled with a BSC 22, which may function to control various BTS operations as well as aspects of air interface operation such as handoff of calls between coverage areas. BSC 22 is then shown coupled with a mobile switching center (MSC) 24, which provides connectivity with the PSTN 26, and BSC 22 is further shown coupled with a packet data serving node (PDSN) 28, which provides connectivity with a packet-switched network 30 such as the Internet for instance. With this arrangement mobile stations 18, 20 may engage in air interface communication with BTS 14 and may thereby communicate via the BTS 14 with various network entities on the PSTN 26 or packet-switched network 30 or with other mobile stations served by the BTS 14.

In practice, the functions described herein may be implemented at the BTS 14, at the BSC 22, and/or at any other component of the system. Each such component, as well as other network components in the system, will preferably include a processing unit (e.g., one or more general purpose processors and/or dedicated processors), data storage (e.g., one or more volatile and/or non-volatile storage components) containing program logic executable by the processor to carry out functions described herein, and a network connection mechanism to facilitate communication with other components of the system. Alternatively, the method could be implemented at least in part by other entities and/or by other types of logic (such as hardware logic for instance). Other implementation mechanisms are possible as well.

Optionally, some or all aspects of the method will be implemented at a time when the RAN 12 exhausts or begins to exhaust its base supply of traffic channels for coverage area 16. For instance, this scenario may arise at a particular time of day when the RAN 12 typically experiences high levels of usage and may need to repeatedly release assigned traffic channels such that the traffic channels may be assigned to new mobile stations in the coverage area 16. In one example, the RAN 12 may automatically implement the method during one or more predetermined time periods of a day. Alternatively, the method may be implemented at some other time. Regardless of the time or scenario, the assumption is that each of a plurality of mobile stations, such as the mobile stations 18, currently has an assigned air interface traffic channel in the coverage area 16.

By way of example, each of the mobile stations 18 may be engaged in or may have recently engaged in a voice call (e.g., a call placed over PSTN 26), a data call (e.g., a wireless packet data session placed over packet-switched network 30 often referred to as a "call"), or some other type of call that uses air interface traffic channel resources in the coverage area 16. The characteristics and form of a particular air interface traffic channel may vary depending on the type of call (e.g., voice or data), the version of air interface protocol being used, and/or other factors.

Generally, an air interface traffic channel may be a dedicated portion of bandwidth that a RAN designates for use by a particular mobile station. For example, each air interface traffic channel may be a radio-based communication link or connection that a mobile station uses to communicate with a BTS. Further, each air interface traffic channel may be defined by a particular frequency, time slot, and/or code. In one example, an air interface traffic channel may be a forward link or reverse link traffic channel over which a mobile station communicates with a BTS. For instance, the mobile station may communicate with the BTS on a traffic channel that is defined by a given frequency and a given encoding structure. In another example, an air interface traffic channel may be a connection that is established between a mobile station and a BTS. For example, the connection may involve a Media Access Control (MAC) ID and channel element that are allocated by a BTS for communicating with the mobile station.

As a specific example, in a conventional Code Division Multiple Access (CDMA) wireless network compliant with the well-known IS-2000 standard, each cell sector employs one or more carrier frequencies, typically 1.25 MHz in bandwidth each, and each wireless service sector is distinguished from adjacent sectors by a pseudo-noise code time offset (PN offset). Further each, cell sector can concurrently communicate on multiple different channels, distinguished from each other by "Walsh codes." When a mobile station operates in a given cell sector, communications between the mobile station and the BTS of the cell sector are carried on a given frequency and are encoded by the sector's PN offset and a given Walsh code.

In an IS-2000 system, data is transmitted in units of frames on both the forward link and reverse link. On either link, there are a limited number of traffic channels for communications in a given wireless service sector. On the forward link, for example, communications are encoded with the sector's PN offset and a given Walsh code. Certain Walsh codes are reserved for use to define control channels, including a pilot channel, a sync channel, and one or more paging channels, and the remainder can be assigned dynamically for use as traffic channels, i.e., to carry user communications. Therefore, in an IS-2000 system, the number of available Walsh codes may limit the number of air interface traffic channels available for voice calls or data calls. As another example, the mobile station may engage in higher rate packet-data communications defined by the industry standard IS-856. In an IS-856 system, an air interface traffic channel may be a connection between the mobile station and the BTS that includes a MAC ID and a channel element.

The MAC ID may be a unique identifier that is assigned to the mobile station such that the mobile station and BTS may identify the mobile station's communications over the radio link. For instance, the MAC ID may be used to identify time slots carrying data to or from the mobile station. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a data rate control (DRC) channel used to indicate the supportable data rate and best serving sector for the forward link. The IS-856 forward link is divided into time slots of length 2048 chips, and each time slot is further time division multiplexed to carry various channels, including a pilot channel, a MAC channel, and, if any traffic exists, a forward traffic channel and a "control" channel. A MAC ID may therefore be used to identify data occurring within one or more time slots as being to/from the mobile station. In some instances, there may be a limited number of available MAC IDs for a RAN to assign to mobile stations, and the number of available MAC IDs may limit the number of simultaneous users for which air interface traffic channels may be allocated.

A channel element may be hardware (e.g., circuit cards or other equipment) and/or software in the BTS that is used to support communication for a given connection. For example, a channel element may be configured to receive a network-level signal and perform encoding, modulation, and/or other operations to convert the network-level signal into an RF signal that the BTS can transmit over a forward link channel. Additionally, a channel element may be configured to receive an RF signal and perform demodulation, decoding, and/or other operations to convert the RF signal into a network-level signal than can be provided to the BSC. In an IS-856 system, a limited number of channel elements may be available in the RAN, on a per coverage area basis for instance. As an example, a RAN may include one or more specific channel elements that are used to define a pilot channel, paging or control channel, forward link traffic channels, access channels, and reverse link traffic channels. Therefore, in some examples, the number of channel elements of a RAN may limit the number of simultaneous users for which air interface traffic channels may be allocated.

b. Assignment and Release of Air Interface Traffic Channels

Once the mobile station has an assigned air interface traffic channel, the mobile station may be considered to be in an "active" mode. To conserve air interface resources, however, a RAN is typically arranged to release the mobile station's assigned air interface traffic channel after a certain amount of time during which no bearer data passes to or from the mobile station. Bearer data may refer to data that carries the actual voice signals or packet-data, as opposed to control data this is used for control purposes. While no bearer data is transmitted between the mobile station and the RAN, the mobile station may be considered to be "idle". Upon release of the mobile station's air interface traffic channel, the mobile station is considered to be in a "dormant" mode, in which it lacks an air interface traffic channel but may still have a data link and an IP address. While in the dormant mode, if the mobile station seeks to conduct a voice call or packet-data communication, the mobile station would re-acquire an air interface traffic channel.

Within an IS-2000 system, a mobile station can engage in cellular voice communications and/or in packet-data communications. To engage in cellular voice communications over PSTN 26, for example, the mobile station may send an origination request over the access channel to the BTS 14, and the request may then pass via the BSC 22 to the MSC 24. The MSC 24 may then signal back to the BSC 22 directing the BSC 22 to assign an air interface traffic channel and associated Walsh code for use by the mobile station. Alternatively, to engage in packet-data communications over packet-switched network 30, the mobile station may, for example, send a packet-data origination request over the access channel to the BTS 14, and the request may then pass via the BSC 22 to the PDSN 28. The PDSN 28 may then signal back to the BSC 22 directing the BSC 22 to assign an air interface traffic channel for use by the mobile station. The PDSN 28 and the mobile station may subsequently negotiate to establish a data link layer connection, such as a point to point protocol (PPP) session. The mobile station may also be assigned an IP address to use.

Once the mobile station has an assigned air interface traffic channel and associated Walsh code, the mobile station may be considered to be in an "active" mode. An IS-2000 system is typically arranged to release the mobile station's assigned air interface traffic channel after a certain amount of time during which no bearer data passes to or from the mobile station. Upon release of the mobile station's air interface traffic channel, the mobile station is considered to be in a "dormant" mode, in which it lacks an air interface traffic channel but may still have a data link and an IP address.

While in the dormant mode, if the mobile station seeks to conduct a voice call or packet-data communication, the mobile station would re-acquire an air interface traffic channel by sending a new origination request message to the BSC. Similarly, if the MSC receives a voice call destined for a dormant mobile station or the PDSN receives packet-data destined for the IP address of a dormant mobile station, the MSC or PDSN would notify the BSC, and the BSC would then page the mobile station to cause the mobile station to re-acquire an air interface traffic channel and associated Walsh code.

Within an IS-856 system, a mobile station can also engage in packet-data communications. To acquire packet data-connectivity under IS-856, the mobile station may detect an IS-856 carrier, send to its BSC a Universal Access Terminal Identifier (UATI) request, and receive in response a UATI, which the mobile station can then use to identify itself in subsequent communications with the BSC. The mobile station may then send a connection-request to the BSC, and the BSC responsively invokes a process to authenticate the mobile station and to have the mobile station acquire a data link. The BSC may then assign an air interface traffic channel by establishing a connection for the data session. To establish the connection, the BSC may assign a time slot to the mobile station (e.g., as indicated by a MAC ID) and allocate a channel element for communicating with the mobile station. The BSC may also direct the mobile station to operate on a particular Walsh coded traffic channel on the reverse link. Further, the BSC may signal to the PDSN, and the PDSN and the mobile station may then negotiate to establish a PPP data link. As in IS-2000, the mobile station may also be assigned an IP address to use.

As in IS-2000, once the mobile station has acquired an IS-856 air interface traffic channel and associated MAC ID, the mobile station is considered to be in an active mode. Further, as in IS-2000, if the mobile station does not send or receive bearer data for a defined period of time, the mobile station enters a dormant mode. In the dormant mode, an IS-856 system maintains the logical state of the mobile station's session (e.g., IP address, PPP state, and radio link session information in the case of packet-data communications), while releasing the mobile station's radio link resources (e.g., the MAC ID and/or channel element that had been allocated for use by the mobile station).

c. Release of Air Interface Traffic Channels Based on Air Interface Conditions The mechanism described herein may allow the RAN to prioritize the release of air interface traffic channels based on determined air interface conditions for the mobile stations. For example, the mechanism may allow the RAN to decide from which of two or more idle mobile stations the RAN should release an air interface traffic channel based on respective air interface conditions of each of the mobile stations. Generally, an air interface condition for a mobile station may be a condition of one or more signals that are sent from the RAN to the mobile station and/or signals that are sent from the mobile station to the RAN via a radio-link between the mobile station and the BTS. For example, an air interface condition may be a signal level or field strength of a signal that the mobile station receives on the forward link. Similarly, the air interface condition may be a signal level or field strength of a signal that the RAN receives on the reverse link. Additionally, in some examples, an air interface condition may be an error rate such as a bit error rate or frame error rate. Other examples are also possible. For instance, an air interface condition may be any other air interface performance metric.

In one instance, an air interface condition may be a signal-to-noise ratio or signal-to-interference ratio. For example, the signal-to-noise ratio may be a measure that compares a level of a received signal to a level of background noise, such as a ratio of signal power to noise power. Likewise, the signal-to-interference ratio may be a measure that compares a level of a received signal to a level of interference.

As an example, the air interface condition may be a pilot strength measurement. In an IS-2000 system, a RAN may periodically send a pilot signal to each mobile station in a coverage area of the RAN. After a mobile station receives the pilot signal, the mobile station may then send a report to the RAN indicating a strength of the received pilot signal. For instance, a mobile station may from time to time transmit to a BTS a pilot strength measurement message (PSMM) or the like that may indicate pilot strength in terms of a ratio of received pilot energy to total power ($E_C/I_o$) or a carrier-to-interference ratio (C/I). The BTS or a BSC coupled to the BTS may then store the reports from each mobile station, possibly only storing a latest report for each mobile station.

In one instance, a RAN may determine an air interface condition based on a reported DRC index. For example, in an IS-856 system, a mobile station may evaluate a signal strength of a forward link signal that a RAN sends to the mobile station, and determine a C/I ratio. Based on the determined C/I ratio, the mobile station may determine a digital rate control (DRC) index and report the DRC index to the RAN. The DRC index may be an integer, for example, on a scale of 0 to 14 that indicates air interface conditions that the mobile station measures on the forward link. Specifically, a DRC index of 1 may correspond to a poor received signal strength while a DRC index of 14 may correspond to a strong received signal strength.

Figure 2:
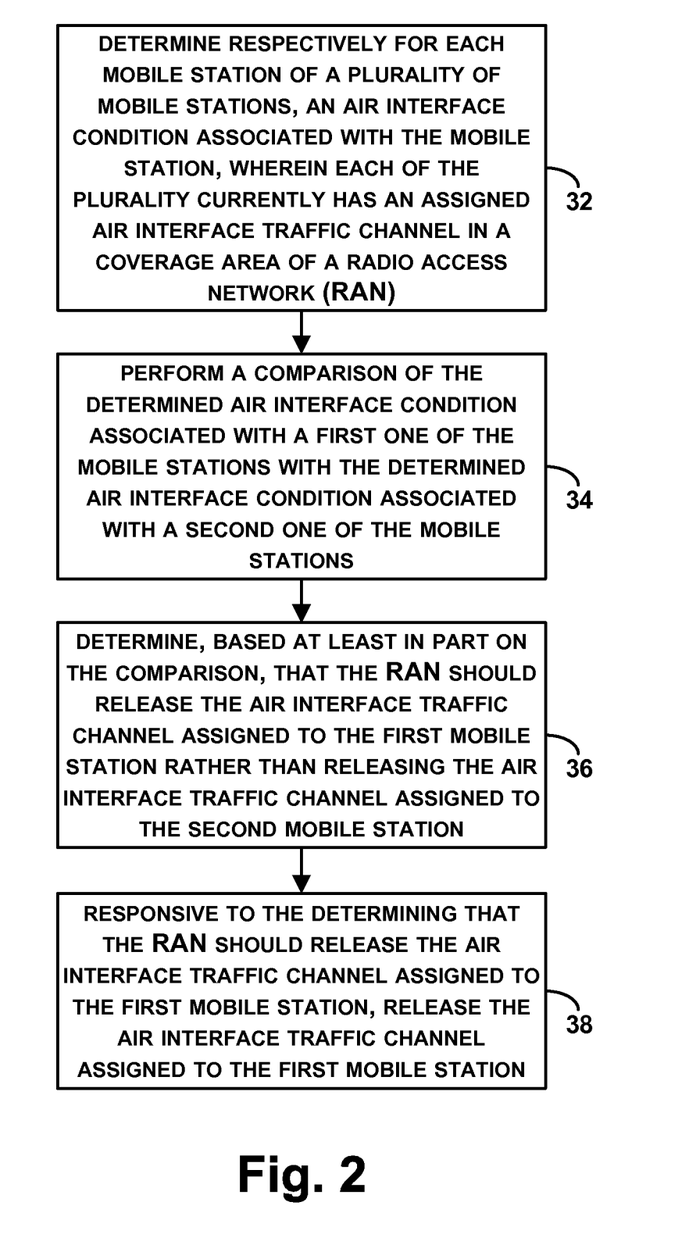
FIG. 2 is a flow chart depicting a set of functions that can be carried out in accordance with the method.

With reference to FIG. 2, a flow chart depicting in summary various functions that may be carried out to prioritize the release of air interface traffic channels is described. One or more of these functions may be carried out by a RAN and particularly by one or more RAN entities, such as any of those described above.

In the process of FIG. 2, each of the plurality of mobile stations currently has an assigned air interface traffic channel in a coverage area of a RAN. As shown in FIG. 2, at block 32, the process may involve determining, respectively for each mobile station of a plurality of mobile stations, an air interface condition associated with the respective mobile station. In one example, the air interface condition for each respective mobile station may include a signal strength, such as a pilot strength provided within a PSMM, a C/I ratio defined by a DRC index, or other similar measure.

In one instance, to determine an air interface condition, a RAN may access a database having one or more stored air interface conditions for each respective mobile station. For example, the RAN may then select from the database a most recently reported air interface condition for each respective mobile station. Alternatively, the RAN may determine an average air interface condition based on a number of the stored air interface conditions. For instance, the RAN may determine an average signal strength or an average of another metric for each respective mobile station based on the last three reported values.

Further, at block 34, the process may involve performing a comparison of the determined air interface condition associated with a first one of the mobile stations with the determined air interface condition associated with a second one of the mobile stations. For instance, the first mobile station and the second mobile station may be idle mobile stations that are selected based on a duration of time that the first mobile station and the second mobile station have each been idle. For example, the first mobile station and the second mobile station may have each been idle for more than a threshold duration (e.g., five seconds). Note that the threshold duration may, for instance, be a duration that is less than a duration associated with a dormancy timer (e.g., ten seconds).

In one example, the RAN may compare a first air interface condition associated with the first mobile station with a second air interface condition associated with the second mobile station to determine whether the first mobile station or the second mobile station is experiencing more favorable air interface conditions. For example, the RAN may determine which of the first air interface condition and the second air interface condition corresponds to a higher received signal strength. As another example, the RAN may determine which of the first air interface condition and the second air interface condition corresponds to a lower error rate. At block 36, the process may then further involve determining, based at least in part on the comparison, that the RAN should release the air interface traffic channel assigned to the first mobile station rather than releasing the air interface traffic channel assigned to the second mobile station. For instance, the RAN may determine that the RAN should release the air interface traffic channel assigned to the first mobile station on the grounds that a second air interface condition associated with the second mobile station is higher than a first air interface condition associated with the first mobile station.

And at block 38, the process may involve, responsive to the determining that the RAN should release the air interface traffic channel assigned to the first mobile station, releasing the air interface traffic channel assigned to the first mobile station. For instance, the RAN may send a connection-close message to the first mobile station.

In an example scenario in which the process of FIG. 2 is carried out by a RAN operating in an IS-2000 system, a RAN may assign an air interface traffic channel and associated Walsh code to each of a plurality of mobile stations. Each of the mobile stations may then report a PSMM to the RAN. If two or more of the plurality of mobile stations are idle, the RAN may compare a first pilot strength that a first idle mobile station reports and a second pilot strength that a second idle mobile station reports to determine which of the first idle mobile station and the second idle mobile station is experiencing more favorable air interface conditions. Upon determining that the second pilot strength is greater, the RAN may determine to release the air interface traffic channel associated with the first idle mobile station. Following, the RAN may reclaim the air interface traffic channel and associated Walsh code that were assigned to the first idle mobile station, and send the first idle mobile station a connection-close message.

Similarly, in a scenario in which the process of FIG. 2 is carried out by a RAN operating in an IS-856 system, a RAN may assign an air interface traffic channel and associated MAC ID to each of a plurality of mobile stations. Each of the mobile stations may then report a DRC index to the RAN. If two or more of the mobile stations are idle, the RAN may compare a first DRC index that a first idle mobile station reports and a second DRC index that a second idle mobile station reports to determine which of the first idle mobile station and the second idle mobile station is experiencing more favorable air interface conditions. Upon determining that the second DRC index is greater, the RAN may determine to release the air interface traffic channel associated with the first idle mobile station. The RAN may then reclaim the air interface traffic channel and associated MAC ID and/or channel element that were assigned to the first idle mobile station, and send the first idle mobile station a connection-close message.

In other examples, a RAN may determine a signal strength measurement (e.g., SNR, C/I, FER, etc.) for communications received from each of multiple mobile stations on the reverse link. The RAN may then compare the respective reverse link signal strengths to determine which mobile station to release a traffic channel from.

Further, in line with the discussion above, a RAN may carry out the process of FIG. 2 when the RAN exhausts or begins to exhaust its base supply of traffic channels for a coverage area and needs to release an air interface traffic channel assigned to one or more mobile stations of the plurality. For example, the RAN may release an assigned air interface traffic channel from an idle mobile station of the plurality so that the RAN can provide an air interface traffic channel to another mobile station. In one instance, the RAN may receive an origination request from a mobile station that does not does not currently have an assigned air interface traffic channel or receive a request to contact a mobile station mobile station that does not does not currently have an assigned air interface traffic channel. The RAN may then carry out some of the functions shown in FIG. 2 in response to receiving either of the requests.

d. Additional Embodiments

A RAN may also make use of information that indicates a duration of time since a last use of an assigned air interface traffic channel by each mobile station to determine which mobile station(s) to release an air interface traffic channel from. For instance, a RAN may select two or more mobile stations for comparison after determining that for at least a threshold duration, bearer data has not flowed on the air interface traffic channels assigned to each of the two or more mobile stations. Rather than forcing mobile stations into dormancy solely based on the expiration of a dormancy timer, the RAN may compare reported air interface conditions for the selected mobile stations after the selected mobile stations have not used an assigned traffic channel for more than the threshold duration that is less than a duration of the dormancy timer, and perhaps force one or more of the selected mobile stations into dormancy by releasing an assigned traffic channel based on the reported air interface conditions.

As an example, a dormancy timer of a RAN may be set to 10 seconds such that after a mobile station has been idle for 10 seconds, the mobile station is forced into dormancy. The RAN may compare reported air interface conditions for mobile stations that have been idle for at least 7 seconds but not more than 10 seconds. If any of the mobile stations have reported air interface conditions that are below a threshold level the RAN may release the traffic channels assigned to the mobile stations reporting air interface conditions below the threshold level. Optionally, the RAN may prioritize the release of air interface traffic channels for the mobile stations reporting air interface conditions below the threshold level (or all of the selected mobile stations) based on the respective air interface conditions of the mobile stations. For example, the RAN may prioritize the release of the air interface traffic channels such that a traffic channel associated with a poorest reported air interface condition is scheduled to be released first, followed by a traffic channel associated with a second poorest reported air interface condition second, and so forth.

To more clearly illustrate the above example, Table 1 shown below provides an example of air interface conditions and elapsed amount of times since a last use of an assigned air interface traffic channel for each of three selected mobile stations (A, B, and C).

TABLE 1

| Mobile Station | Elapsed Time | DRC Index |
|---|---|---|
| A | 8 | 12 |
| B | 7.5 | 2 |
| C | 7.7 | 3 |

Consistent with the above example, the RAN may select the three mobile stations for comparison because each of the three mobile stations has been idle for at least 7 seconds but not more than 10 seconds. As indicated by the DRC indexes shown in Table 1, mobile station A has reported more favorable air interface conditions than mobile stations B and C. Recall, that a high DRC index is associated with a strong received signal while a low DRC index is associated with a lesser received signal strength. In one instance, based on a comparison of the respective DRC indexes for each of the mobile stations, the RAN may select to release the assigned air interface traffic channel from mobile station B, the mobile station having the lowest DRC index. In another instance, the RAN may select to release the assigned air interface traffic channels from both mobile station B and mobile station C because mobile station B and mobile station C have reported DRC indexes that are below a threshold level (e.g., a DRC index of 6).

In a further instance, as the elapsed amount of time since a mobile station has not used an assigned air interface traffic channel increases, the threshold level may increase. For instance, if a mobile station does not use an assigned air traffic channel for 7 seconds, the RAN may compare a reported air interface condition for the mobile station to a first threshold level (e.g., a DRC index of 6). If the air interface condition for the mobile station is below the first threshold level, the RAN may release the traffic channel from the mobile station. If the air interface condition is above the first threshold level, the RAN may wait a brief period of time has elapsed (e.g., 1 or 2 seconds) until comparing the air interface condition to a second threshold level that is greater than the first threshold level (e.g., a DRC index of 8). After the expiration of the brief period of time, the RAN may then compare the reported air interface condition (or a subsequently reported air interface condition) to the second threshold level. If the air interface condition is below the second threshold level, the RAN may release the traffic channel from the mobile station. If the air interface condition is above the second threshold level, the RAN may allow the mobile station to maintain the traffic channel until a dormancy timer expires.

In some examples, a level of load in a coverage area of the RAN may be used to establish the threshold duration. For example, when more than a threshold number of origination requests are received during a certain timeframe, the threshold duration may be decreased. Similarly, if less than a threshold number of origination requests are received during a certain timeframe, the threshold duration may be increased. This may allow mobile stations to keep assigned traffic channels without using the traffic channel for a longer duration when the level of load in a coverage area is low and allow the RAN to release traffic channels more quickly when experiencing a high level of load in the coverage area.

In one instance, the level of load may be associated with the number of traffic channels currently assigned for a coverage area. For example, the level of load may be a percentage of assigned traffic channels relative to a total number of available traffic channels for a coverage area. If the percentage is above a percentage threshold (e.g., 75%) the percentage may be indicative of a high level of load while if the percentage is less than the percentage threshold, the percentage may be indicative of a low level of load. Other examples are also possible.

Although the functions of the process of FIG. 2 have been described with respect to CDMA2000 (e.g., 1×RTT and EV-DO) communications, the process may apply equally to other air interface protocols in which traffic channels are assigned to mobile stations. For other example air interface protocols, a RAN may determine other information that is indicative of air interface conditions for the mobile stations to help prioritize the release of assigned air interface traffic channels.

By way of example, in LTE systems, an air interface condition may be a channel quality indicator (CQI). In this approach, a mobile station receives a forward link reference signal transmitted by the BTS and measures a signal-to-interference plus noise ratio (SINR). The mobile station then transmits a CQI to a RAN to indicate a data rate that can be supported based on the measured SINR. The CQI is an index, typically between 0 and 15, that identifies a specific modulation and coding scheme which, in turn, is associated with a particular data rate. Thus, the CQI index reported by a mobile station provides an indication of the signal quality (e.g., SINR) that the mobile station is experiencing.

As another example, a mobile station, such as a mobile station communicating via SMS messaging, may report a frame error rate (FER) to a RAN. The FER may be a ratio of the amount of data received with errors to the total amount of data received. Thus, the FER may also be indicative of the quality of a signal connection between a BTS and a mobile station. Other examples are also possible.

e. Example RAN Configuration

Figure 3:
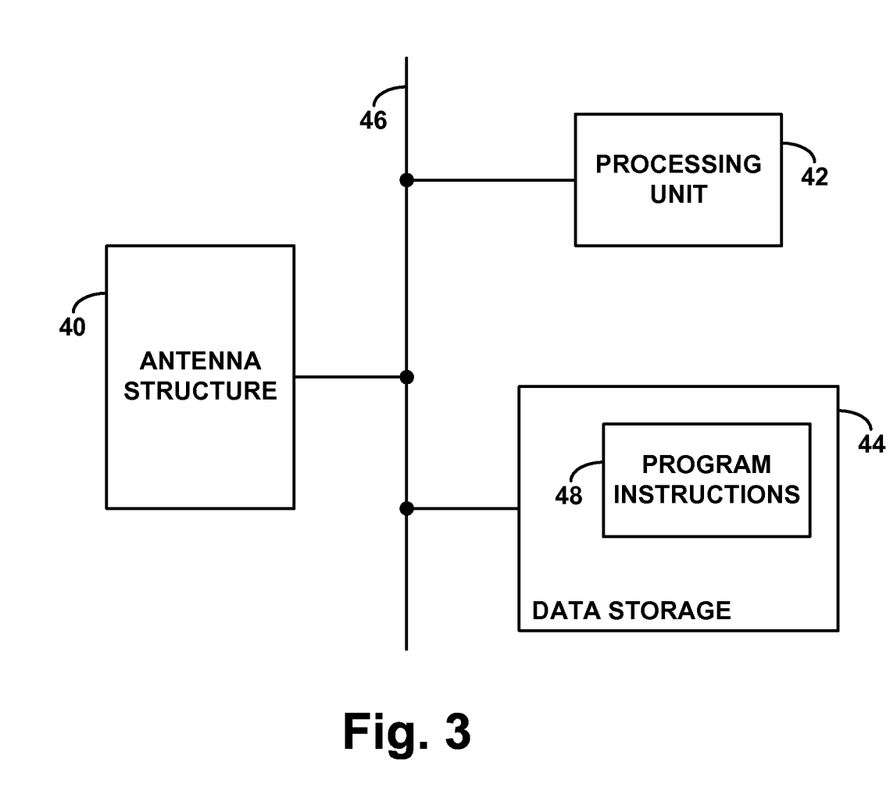
FIG. 3 is simplified block diagram depicting components of a RAN that may implement the method.

FIG. 3 is next a simplified block diagram depicting components of an example RAN arranged to implement this process. As shown, the example RAN includes an antenna structure 40, a processing unit 42, and data storage 44, all of which may be coupled together by a network or other connection mechanism 46. This arrangement may represent a macro network RAN, a femtocell, or other configuration.

Antenna structure 40 may comprise one or more antennas configured to radiate so as to define an air-interface coverage area, as well as a variable power amplifier to facilitate power adjustments as discussed above. In operation, the antenna structure would receive from a particular mobile station in the air-interface coverage area a channel assignment request, such as an origination request to which the RAN would respond by assigning a traffic channel. Further, the antenna structure would transmit to the particular mobile station an assignment message assigning the particular mobile station to use a particular traffic channel for air interface communication in the coverage area.

Processing unit 42 and data storage 44 may then cooperatively define a controller (though the controller could take other forms) that functions to select the traffic channel to assign to the particular mobile station. As such, the processing unit 42 may comprise one or more general purpose processors (e.g., microprocessors) and/or one or more special purpose processors, and the data storage may comprise any type of non-transitory computer readable medium, which may include one or more volatile and/or non-volatile storage components, such as magnetic, optical, or flash storage. Data storage 44 could be integrated in whole or in part with the processing unit 42.

As shown, the data storage 44 may then hold program instructions (such as machine language instructions) 48 executable by the processing unit 42 to carry out various functions described herein. For instance, the program instructions may be executable by the processing unit to determine, respectively for each mobile station of a plurality of mobile stations, an air interface condition associated with the mobile station, and perform a comparison of the determined air interface condition associated with a first one of the mobile stations with the determined air interface condition associated with a second one of the mobile stations. Further, the program instructions may be executable by the processing unit to then determine, based at least in part on the comparison, that the RAN should release the air interface traffic channel assigned to the first mobile station, and to responsively release the air interface traffic channel assigned to the first mobile station.

An exemplary embodiment of the present method has been described above. Those of ordinary skill in the art will appreciate, however, that changes from the embodiment are possible, while remaining within the scope of the claims.

We claim:

1. A method of managing air interface traffic channels in a coverage area of a radio access network (RAN), wherein each of a plurality of mobile stations currently has an assigned air interface traffic channel in the coverage area, the method comprising the following functions:

the RAN determining, respectively for each mobile station of the plurality, an air interface condition associated with the mobile station;

the RAN determining that, for at least a threshold duration, traffic has not flowed on the air interface traffic channel assigned to a first one of the mobile stations and on the air interface traffic channel assigned to a second one of the mobile stations, wherein the threshold duration is less than a duration of a dormancy timer;

responsive to the determining that, for at least the threshold duration, traffic has not flowed on the air interface traffic channel assigned to the first mobile station and on the air interface traffic channel assigned to the second mobile station, the RAN performing a comparison of the determined air interface condition associated with the first mobile station with the determined air interface condition associated with the second mobile station;

the RAN determining, based at least in part on the comparison, that the RAN should release the air interface traffic channel assigned to the first mobile station rather than releasing the air interface traffic channel assigned to the second mobile station; and responsive to the determining that the RAN should release the air interface traffic channel assigned to the first mobile station, the RAN releasing the air interface traffic channel assigned to the first mobile station, wherein the releasing occurs before expiration of the dormancy timer for the first mobile station.

2. The method of claim 1, further comprising:

determining a level of load in the coverage area; and dynamically setting the threshold duration based on the determined level of load in the coverage area.

3. The method of claim 1, wherein the air interface condition for each respective mobile station comprises a signal strength.

4. The method of claim 3, wherein the signal strength comprises a forward-link signal strength selected from the group consisting of (i) a digital rate control (DRC) index, (ii) a pilot strength measurement message (PSMM), (iii) a channel quality indicator (CQI), and (iv) a frame error rate (FER).

5. The method of claim 3, wherein the signal strength comprises a reverse-link signal strength.

6. The method of claim 1, wherein releasing the air interface traffic channel assigned to the first mobile station comprises sending a connection close message to the first mobile station.

7. The method of claim 1, carried out by a RAN entity selected from the group consisting of a base transceiver station and a RAN controller.

8. The method of claim 1, further comprising:

the RAN receiving an origination request from a mobile station not in the plurality; and responsive to receiving the origination request, the RAN carrying out the functions of claim 1.

9. A radio access network (RAN) comprising:

an antenna structure arranged to radiate so as to define an air interface coverage area in which to serve a plurality of mobile stations; and a controller arranged to:

(i) assign to each of the plurality of mobile stations a respective air interface traffic channel in the air interface coverage area, (ii) determine that the air interface traffic channel assigned to each respective mobile station of the plurality has been idle for at least a threshold duration, wherein the threshold duration is less than a duration of a dormancy timer, (iii) determine, respectively for each mobile station of the plurality, an air interface condition associated with the mobile station, (iv) responsive to the determining that the air interface traffic channel assigned to each respective mobile station of the plurality has been idle for at least the threshold duration, compare the determined air interface conditions of the plurality of mobile stations to identify a mobile station that has a poorest determined air interface condition, and (v) responsive to the identifying of the mobile station that has the poorest determined air interface condition, releasing the air interface traffic channel assigned to the identified mobile station, wherein the releasing occurs before expiration of the dormancy timer for the identified mobile station.

10. The RAN of claim 9, wherein the controller is arranged to dynamically set the threshold duration based on a level of load in the coverage area.

11. The RAN of claim 9, wherein the air interface condition for each respective mobile station comprises a signal strength.

12. The RAN of claim 11, wherein the signal strength comprises a forward-link signal strength selected from the group consisting of (i) a digital rate control (DRC) index, (ii) a pilot strength measurement message (PSMM), (iii) a channel quality indicator (CQI), and (iv) a frame error rate (FER).

13. The RAN of claim 11, wherein the signal strength comprises a reverse-link signal strength.

14. The RAN of claim 9, wherein releasing the air interface traffic channel assigned to the identified mobile station comprises sending a connection close message to the identified mobile station.

15. A non-transitory computer readable medium having stored thereon instructions executable by a processing unit to carry out functions comprising:
   determining, respectively for each mobile station of a plurality of mobile stations, an air interface condition associated with the mobile station, wherein each of the plurality of mobile stations currently has an assigned air interface traffic channel in a coverage area of a radio access network (RAN);
   determining that, for at least a threshold duration, traffic has not flowed on the air interface traffic channel assigned to a first one of the mobile stations and on the air interface traffic channel assigned to a second one of the mobile stations, wherein the threshold duration is less than a duration of a dormancy timer;
   responsive to the determining that, for at least the threshold duration, traffic has not flowed on the air interface traffic channel assigned to the first mobile station and on the air interface traffic channel assigned to the second mobile station, performing a comparison of the determined air interface condition associated with the first mobile station with the determined air interface condition associated with the second mobile station;
   determining, based at least in part on the comparison, that the RAN should release the air interface traffic channel assigned to the first mobile station rather than releasing the air interface traffic channel assigned to the second mobile station; and
   responsive to the determining that the RAN should release the air interface traffic channel assigned to the first mobile station, releasing the air interface traffic channel assigned to the first mobile station,
   wherein the releasing occurs before expiration of the dormancy timer of the first mobile station.

16. The non-transitory computer-readable medium of claim 15, wherein the functions further comprise dynamically setting the threshold duration based on a level of load in the coverage area.

17. The non-transitory computer readable medium of claim 15, wherein the air interface condition for each respective mobile station comprises a signal strength.

18. The non-transitory computer readable medium of claim 15, wherein releasing the air interface traffic channel assigned to the first mobile station comprises sending a connection close message to the first mobile station.

* * * * *